E. E. ROSE.
BARRIER SEAL.
APPLICATION FILED JAN. 4, 1916.

1,246,470.

Patented Nov. 13, 1917.

WITNESSES:
R. J. Fitzgerald.
D. C. Davis.

INVENTOR
Edward E. Rose.
BY
Wesley G. Carr
ATTORNEY

UNITED STATES PATENT OFFICE.

EDWARD E. ROSE, OF SWISSVALE, PENNSYLVANIA, ASSIGNOR TO WESTINGHOUSE ELECTRIC AND MANUFACTURING COMPANY, A CORPORATION OF PENNSYLVANIA.

BARRIER-SEAL.

1,246,470.      Specification of Letters Patent.      Patented Nov. 13, 1917.

Application filed January 4, 1916. Serial No. 70,247.

*To all whom it may concern:*

Be it known that I, EDWARD E. ROSE, a citizen of the United States, and a resident of Swissvale, in the county of Allegheny and State of Pennsylvania, have invented a new and useful Improvement in Barrier-Seals, of which the following is a specification.

My invention relates to sealing means for closed containers, and it has for its object to provide means of the character described that shall be simple and inexpensive to apply and tight and effective in operation, even though subjected to severe mechanical treatment and to wide temperature variations.

Figure 1:
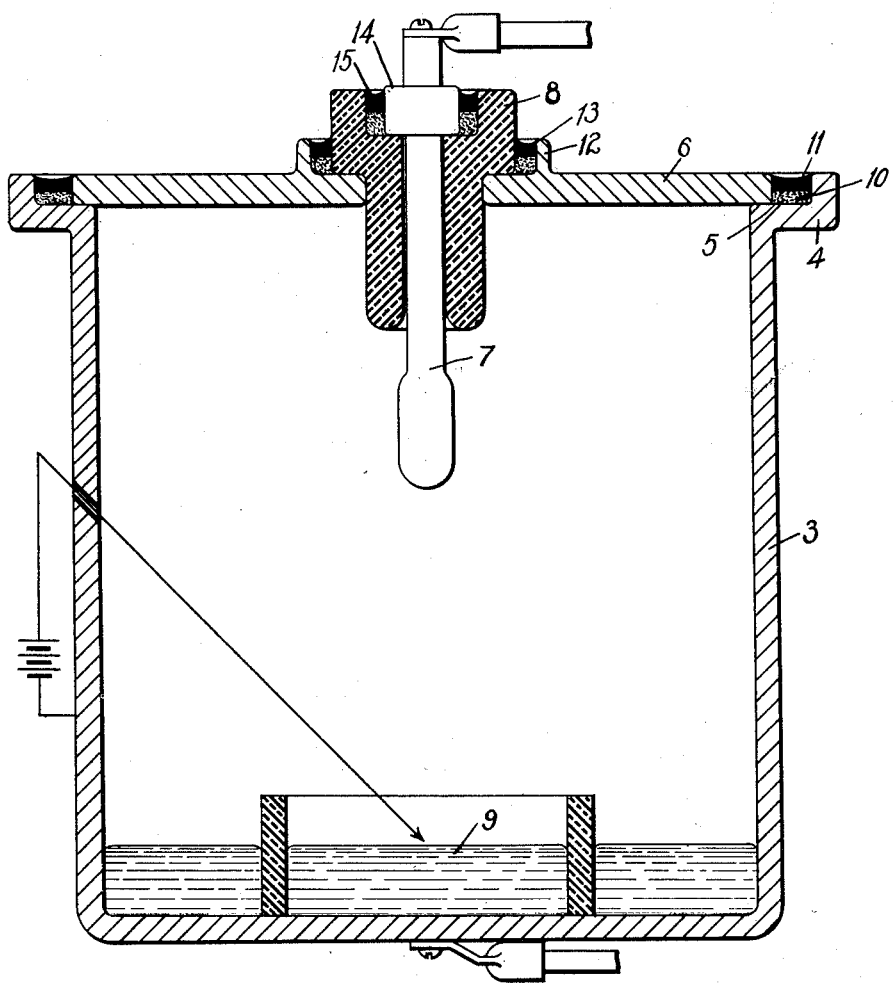
Figure 2:
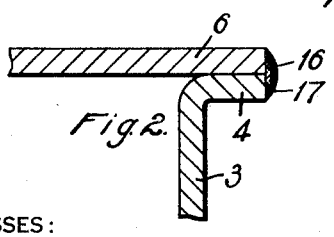
Figure 3:
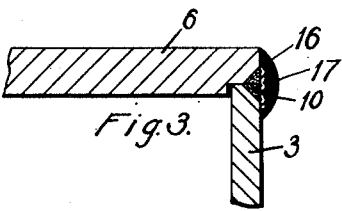

In the accompanying drawing, Figure 1 is a side view, partially in section and partially in elevation, of a vapor converter embodying a preferred form of my invention; and Figs. 2 and 3 are detail views, illustrating modifications of the sealing means shown in Fig. 1.

In the construction of vapor converters of the metal-case type and of similar forms of apparatus, it is essential to provide a container which may be readily opened for inspection and repair and which, when closed, may be readily sealed in an effective manner by relatively unskilled persons. Mercury has been frequently employed for the purpose of obtaining a tight joint but, because of its liquid state, it is apt to slop out of the joint when the converter is subjected to extreme vibration, as, for example, when mounted on a railway locomotive.

Another and more serious objection to the use of mercury as the sealing agent resides in the fact that it does not closely adhere to the sides of the joint but permits leakage along the solid surfaces against which it lies. Furthermore, a body of sealing mercury occludes gas when exposed to the air, and the gas-bearing mercury then circulates to a point where it is exposed to vacuum, with resultant freeing of the occluded gases and deterioration of the vacuum.

There are various compositions of waxes, rubber, gutta-percha, balata, gum and coaltar derivatives which are of sufficient rigidity to maintain their place at the usual temperature of operation of a vehicle converter and which are so plastic and impervious in nature as to maintain a tight seal under all conditions of operation. Said sealing materials are prepared, in a more or less liquid state, by the use of suitable volatile solvents for application to the joint and are then hardened by heating. At the time of application, a small portion of said liquid material frequently seeps across the machined faces of the joint into the interior of the container, and, furthermore, the application of heat first hardens the outer portions of the sealing mass, and gases, driven off from the inner portions thereof by subsequent heating, are inclosed or pocketed in such a manner that they may leak into the container. Both of these phenomena operate to supply undesirable gas and volatile matter to the interior of the container to cause deterioration of the vacuum, especially upon the production of excessive heat during operation.

The above-described actions may be effectively prevented by first bridging the joints between the various parts of a vapor converter by barriers of refractory, gas-free material of considerable rigidity, such, for example, as plaster of Paris, mica, metal alloy, or even paper, and by then applying a layer of said sealing material outside said barrier. Heat is then applied to oxidize, carbonize or otherwise harden the sealing material. By this means, little or no hydrocarbon finds its way to the interior of the container, and satisfactory operation is insured.

Referring to the drawing for a more detailed understanding of my invention, I show the main portion of a vapor converter of the metal-case type at 3 in Fig. 1. The member 3 is provided with an outwardly and upwardly extending flange 4 at the upper end thereof, forming a seat 5 upon which rests a cover member 6, preferably of metal. An anode 7 projects through the cover 6 and is insulated therefrom by a bushing 8, constructed, preferably, of porcelain. The anode 7 coacts with a mercury cathode 9 contained in the bottom of the member 3 for rectifier operation, as is well known in the art. A layer 10 of refractory, gas-free material is applied to the seat 5 to cover the joint between the member 3 and the cover 6, and a layer 11 of plastic sealing material is placed thereover. As there is a wide variety of materials available for use in this connection, I do not desire to confine myself to any special composition of matter but I have obtained excellent results with the paracumaron-para-indene resinous compounds of rubber or balata disclosed in a co-pending application of James P. A. McCoy, Serial No. 76,020, filed Feb. 3, 1916, and assigned to the Westinghouse Electric & Manufacturing Company. The barrier 10 prevents the entry of liquid or gaseous material into the interior of the container and thus, while being unable, in itself, to effectively seal the device, it so supports, and cooperates with, the plastic viscous sealing material as to enable the latter to succesfully perform its functions under the somewhat trying conditions involved.

In a similar manner, an upstanding flange 12 on the cover 6 may serve as a retaining means for a seal 13 between the cover and the bushing 8, and the upper portion of the bushing 8 is spaced away from an annular flange 14 on the anode 7 to provide space for a seal 15 therebetween.

In the form of my invention shown in Fig. 2, the body 3 of a vapor converter is provided with an outwardly extending flange 5 upon which rests a cover 6. A strip 16 of refractory material, such, for example, as mica or paper, bridges the joint between the flange 4 and the cover 6 and is covered, in turn, by a layer 17 of sealing material having sufficient rigidity to maintain its form without other means of support.

A more reliable form of the joint shown in Fig. 2 is illustrated in Fig. 3. A cover 6 rests upon a container 3 and a V shaped groove is formed at the outer edge of the abutting faces thereof. A barrier 10, similar to that employed in Fig. 1, is placed in said groove and may, if desired, be covered by a layer 16 of paper, mica or similar sheet material. A layer 17 of sealing material is then placed over the entire joint, forming a structure that is simple, rugged and effective.

With any form of my invention, I may, if desired, provide mechanical clamping means between the different members in order to prevent relative movement thereof and consequent excessive strains upon the sealing means.

While I have shown my invention in its preferred forms, it will be obvious to those skilled in the art that it is susceptible of various minor changes and modifications without departing from the spirit thereof, and I desire, therefore, that only such limitations shall be placed thereupon as are imposed by the prior art or are specifically set forth in the appended claim.

I claim as my invention:

The combination with an evacuated container provided with an opening in the wall thereof, of a member mounted to close said opening, means for producing heat within said container, a barrier of refractory material bridging the joint between said container and said closing member, and a layer of gas-evolving sealing material overlying said barrier and sealing said container, said barrier preventing the direct exposure of said sealing layer to said heat source.

In testimony whereof, I have hereunto subscribed my name this 27th day of Dec. 1915.

EDWARD E. ROSE.